United States Patent
Wang et al.

(10) Patent No.: US 11,314,689 B2
(45) Date of Patent: Apr. 26, 2022

(54) METHOD, APPARATUS, AND COMPUTER PROGRAM PRODUCT FOR INDEXING A FILE

(71) Applicant: EMC IP Holding Company LLC, Hopkinton, MA (US)

(72) Inventors: Donglei Wang, Beijing (CN); Zhiqiang Li, Beijing (CN); Lei Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 438 days.

(21) Appl. No.: 16/249,170

(22) Filed: Jan. 16, 2019

(65) Prior Publication Data
US 2019/0220443 A1    Jul. 18, 2019

(30) Foreign Application Priority Data
Jan. 18, 2018  (CN) .......................... 201810049155.2

(51) Int. Cl.
| G06F 16/13 | (2019.01) |
| G06F 16/11 | (2019.01) |
| G06F 16/18 | (2019.01) |
| G06F 21/80 | (2013.01) |
| G06F 3/06  | (2006.01) |

(52) U.S. Cl.
CPC ............ *G06F 16/13* (2019.01); *G06F 16/116* (2019.01); *G06F 16/181* (2019.01); *G06F 3/061* (2013.01); *G06F 3/067* (2013.01); *G06F 21/80* (2013.01)

(58) Field of Classification Search
CPC ...... G06F 16/116; G06F 16/13; G06F 16/181; G06F 21/80; G06F 3/061; G06F 3/067
USPC ........................................................ 707/741
See application file for complete search history.

(56) References Cited

U.S. PATENT DOCUMENTS

| 7,225,204 | B2 * | 5/2007 | Manley ............... | G06F 11/2066 707/639 |
| 7,249,219 | B1 * | 7/2007 | Mowat ................ | G06F 12/0813 711/113 |
| 7,321,962 | B1 * | 1/2008 | Fair ........................ | G06F 3/0619 711/202 |
| 8,612,488 | B1 * | 12/2013 | Subramanya ....... | G06F 16/2246 707/803 |
| 8,954,383 | B1 * | 2/2015 | Vempati ................ | G06F 16/128 707/610 |
| 8,996,490 | B1 * | 3/2015 | Armangau ............. | G06Q 30/02 707/705 |
| 9,020,903 | B1 * | 4/2015 | Vempati ................ | G06F 3/0619 707/674 |
| 9,280,578 | B1 |  3/2016 | Zhou et al. | |

(Continued)

*Primary Examiner* — Shahid A Alam
(74) *Attorney, Agent, or Firm* — BainwoodHuang (57) ABSTRACT

Techniques index a file. The techniques involve: determining, based on a first mapping stored in a first inode associated with the file, whether a predetermined conversion condition is satisfied. The first mapping points to a plurality of data blocks of a file system storing the file in a first index structure. The techniques further involve, in response to determining that the predetermined conversion condition is satisfied, creating a second inode associated with the file. The techniques further involve converting the first mapping into a second mapping to be stored in the second inode. The second mapping points to the plurality of data blocks in a second index structure different from the first index structure.

20 Claims, 4 Drawing Sheets

(56) References Cited

U.S. PATENT DOCUMENTS

| | | | |
|---|---|---|---|
| 9,594,513 B1 | 3/2017 | Delgado et al. | |
| 9,612,754 B1 | 4/2017 | Delgado et al. | |
| 9,678,879 B2* | 6/2017 | Whitehouse | G06F 16/172 |
| 9,837,435 B1* | 12/2017 | Chang | H01L 27/11502 |
| 9,916,191 B1 | 3/2018 | Pan et al. | |
| 10,180,790 B1 | 1/2019 | Taylor et al. | |
| 10,387,369 B1* | 8/2019 | Davenport | G06F 16/128 |
| 10,585,594 B1 | 3/2020 | Armangau et al. | |
| 10,761,762 B2 | 9/2020 | Armangau et al. | |
| 10,762,047 B2 | 9/2020 | Armangau et al. | |
| 2004/0105332 A1* | 6/2004 | Crow | G06F 16/10 |
| | | | 365/202 |
| 2008/0172563 A1* | 7/2008 | Stokes | G06F 21/80 |
| | | | 713/193 |
| 2011/0313973 A1* | 12/2011 | Srivas | G06F 16/27 |
| | | | 707/634 |
| 2013/0138705 A1* | 5/2013 | Agetsuma | G06F 3/0683 |
| | | | 707/822 |
| 2014/0095437 A1* | 4/2014 | Hwang | G06F 11/1469 |
| | | | 707/634 |

\* cited by examiner

METHOD, APPARATUS, AND COMPUTER PROGRAM PRODUCT FOR INDEXING A FILE

FIELD

Embodiments of the present disclosure relate to the field of data storage, and more particularly, to a method, apparatus and computer program product for indexing a file.

BACKGROUND

A file system has a corresponding structure and logic for controlling storage and retrieval of information. Some file system may be related to a particular application. In order to manage the storage effectively, the file system generally creates inodes for storing information associated with file system objects (such as files). The file system may create an associated inode for each stored file. An inode is a data structure in which no data of the file but rather some specific information associated with the file is directly stored. For example, the inode can store file metadata, such as the file owner, file size, Access Control List (ACL) and the like. The inode also stores mapping information, which indicates the storage address of the file in the system. When performing the input/output (I/O) operations for specific data of the file such as reading, writing, deleting and the like, the inode is to be accessed to retrieve the mapping information to determine the storage address of the corresponding data in the file.

SUMMARY

Embodiments of the present disclosure provide a solution for indexing a file.

In a first aspect of the present disclosure, there is provided a method of indexing a file. The method includes: determining, based on a first mapping stored in a first inode associated with the file, whether a predetermined conversion condition is satisfied. The first mapping points to a plurality of data blocks of a file system storing the file in a first index structure. The method also includes in response to determining that the predetermined conversion condition is satisfied, creating a second inode associated with the file. The method further includes converting the first mapping into a second mapping to be stored in the second inode. The second mapping points to the plurality of data blocks in a second index structure different from the first index structure.

In a second aspect of the present disclosure, there is provided an apparatus for indexing a file. The apparatus includes a processor and a memory coupled to the processor and having instructions stored thereon, the instructions, when executed by the processor, causing the apparatus to perform acts. The acts include determining, based on a first mapping stored in a first inode associated with the file, whether a predetermined conversion condition is satisfied. The first mapping points to a plurality of data blocks of a file system storing the file in a first index structure. The acts also include in response to determining that the predetermined conversion condition is satisfied, creating a second inode associated with the file. The actions further include converting the first mapping into a second mapping to be stored in the second inode. The second mapping points to the plurality of data blocks in a second index structure different from the first index structure.

In a third aspect of the present disclosure, there is provided a computer program product. The computer program product is tangibly stored on a computer-readable medium and includes machine-executable instructions, the machine executable instructions, when executed, causing a machine to perform the method according to the first aspect.

In a fourth aspect of the present disclosure, there is provided a computer-readable medium having computer-readable instructions stored thereon. The computer-readable instructions, when executed, cause a device to perform the method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The objectives, advantages and other features of the present disclosure will become more apparent through the detailed description of example embodiments of the present disclosure with reference to the accompanying drawings, where the same reference symbols generally refers to the like elements in the example embodiments of the present disclosure.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to several example embodiments illustrated in the drawings. Although some preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the term "include" and its variants are to be read as open-ended terms that mean "include, but is not limited to." The term "or" is to be read as "and/or" unless explicitly being defined otherwise. The term "based on" is to be read as "based at least in part on." The terms "one example embodiment" and "an embodiment" are to be read as "at least one example embodiment." The term "another embodiment" is to be read as "at least one further embodiment." The terms "first" and "second" can represent different or the same objects. Other definitions, either explicit or implicit, may be included below.

As used herein, the term "file" includes an electronic file of a variety of formats that contains a variety of types of contents, such as an electronic document, an image file, a video file, an audio file, or files of any other formats.

Figure 1:
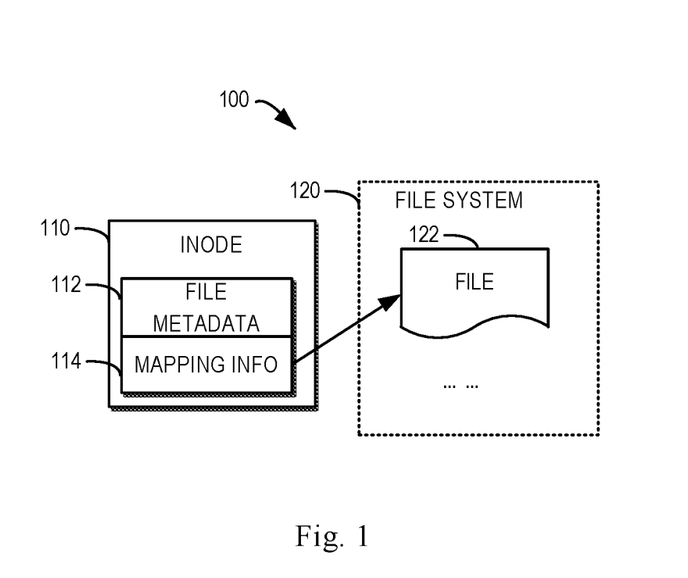
FIG. 1 illustrates a schematic diagram of an environment in which embodiments of the present disclosure can be implemented.

FIG. 1 illustrates a schematic diagram of an environment 100 in which embodiments of the present disclosure can be implemented. The environment 100 includes a file system 120 for storing one or more files 122, each file having an associated inode 110. The inode 110 can also be considered as an index file, used for storing file metadata 112 and mapping information 114. The file metadata 112 includes information, for example, the file owner, file size, Access Control List (ACL) and the like. The mapping information 114 is used for pointing to a storage address of the file 122 in the file system, e.g., addresses of disk blocks of a physical disk in the file system 120. Typically, different data portions of the file 122 are stored in a plurality of disk blocks having the same size (for example, 8 KB or other size) in the file system 120, and such a disk block is referred to as a data block. In some examples, the mapping information 114 is used for indicating a mapping between logic offset addresses of the data in the file 122 and the disk block addresses. In order to address data of the file 122, it is needed to obtain the mapping information 114 first and then to determine the disk block addresses corresponding to the data based on the mapping information 114.

The metadata 112 and/or mapping information 114 of the inode 110 can be stored in the physical disk of the file system 120. In some cases, the inode 110 can be cached in the memory or other storage devices that can be quickly accessed so as to support rapid read/write. The size of the inode 110 is typically fixed. Of course, the size of the inode 110 may also be configured in some cases.

Figure 2A:
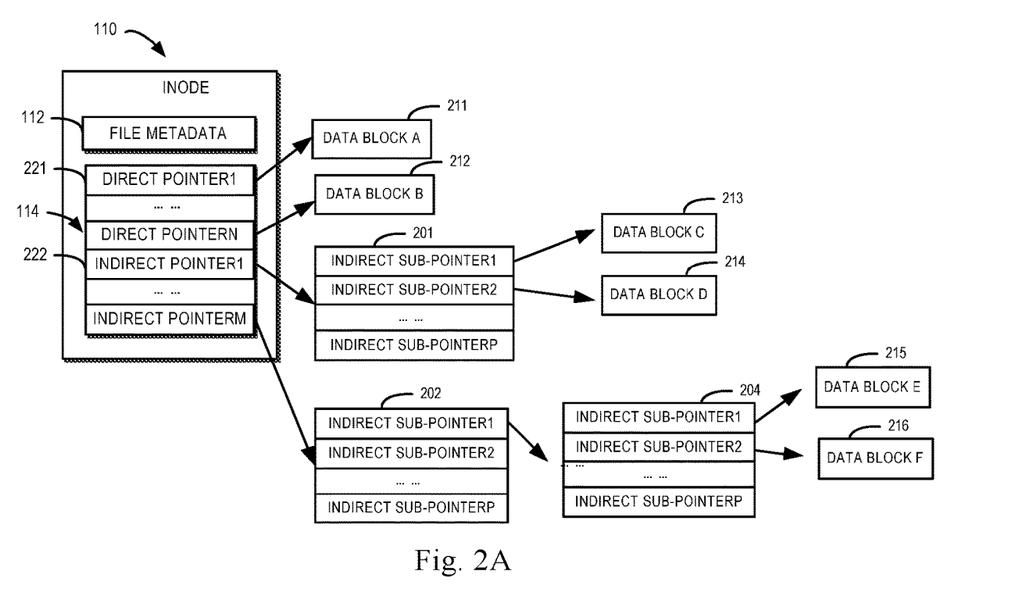
FIG. 2A and FIG. 2B illustrate example structures of an inode in accordance with embodiments of the present disclosure.
Figure 2B:
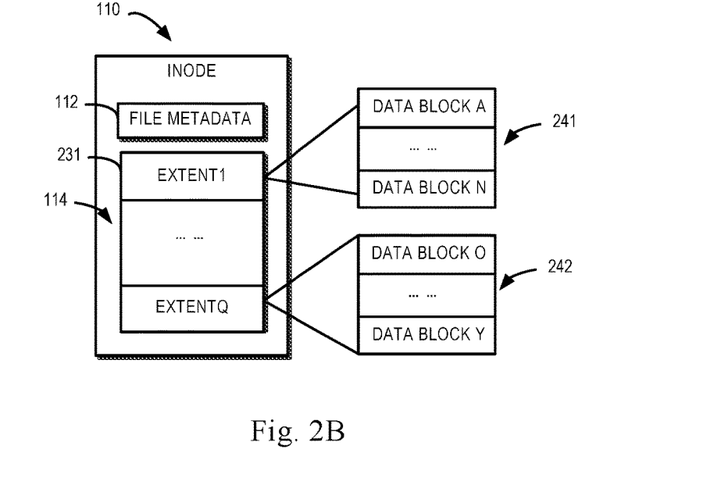

The mapping information 144 of the inode 110 may point to different data blocks storing the file 122 using a corresponding index structure. There are some index structures that can be applied for the inode 110. FIG. 2A and FIG. 2B illustrate two example index structures.

In the example of FIG. 2A, a pointer-based index structure is illustrated. The mapping information 114 includes one or more direct pointers 221 (N direct pointers in this example) and one or more indirect pointers 222 (M indirect pointers in this example). Each direct pointer 221 directly points to a single data block of the file 122. For example, a direct pointer 1 points to a data block A 211 while a direct pointer N points to a data block B 212. Each data block corresponds to a disk block storing a part of data of the file 122 in the file system 120, and has a corresponding disk block address.

Different from the direct pointer 221, each indirect pointer 222 indirectly points to one or more data blocks of the file 122. Specifically, each indirect pointer 222 directly points to an indirect index block and each indirect index block includes a plurality of indirect sub-pointers. Each indirect sub-pointer can directly point to a single data block of the file 122 or point to a further indirect index block. It can finally point to a single data block of the file 122 by way of one-layer or multi-layer indirect index blocks.

For example, in FIG. 2A, an indirect pointer 1 directly points to an indirect index block 201 including a plurality of indirect sub-pointers, one or more of which indirect sub-pointers directly point to a data block C 213 and a data block D 214 of the file 122. An indirect pointer M directly points to an indirect index block 202, which further directly points to another indirect index block 202. Through such multi-level indirect pointing, it finally points to an indirect index block 204 which includes one or more indirect sub-pointers directly pointing to a data block E 215 and a data block F 216 of the file 122. The indirect index block may also be stored in the file system 120 and can be partially or fully cached in a storage device that can be accessed quickly such as a memory.

In such pointer-based index structure, the number of direct pointers 221 and indirect pointers 222 depends on the size of the inode 110. In a specific example, the inode 110 can include 16 direct pointers and 5 indirect pointers. Of course, this is only an example and any other number of pointers is also possible. By means of the indirect indexing in the pointer-based index structure, it is possible to address the problem of limited size of the inode 110 so as to point to as many data blocks of the file 122 as possible.

FIG. 2B illustrates a further extent-based index structure in the inode 110. As shown in FIG. 2B, the mapping information 114 includes a plurality of extents 231 (Q extents in this example) and each extent can describe a plurality of consecutive data blocks storing the file 122. The disk block addresses of the plurality of consecutive data blocks in the file system 120 are consecutive, where the file logic address of the data storing the file 122 is also consecutive. Each data block corresponds to a disk block storing part of data of the file 122 in the file system 120 and has a corresponding disk block address.

Each extent 231 may include a file logic block address (e.g., a file offset) of the stored file data in the consecutive data blocks to which it points, a disk block address of the consecutive data blocks s to which it points, and the number of the consecutive data blocks. The extent may store more data than the pointer. Therefore, the mapping information 114 of the inode 110 will include a smaller number of extents in the case of identical inode size.

In the example of FIG. 2B, the extent 231 may directly point to a set of consecutive data blocks 241 of the file 122, including a data block A to a data block N having consecutive disk block addresses. The extent 232 can directly point to a further set of consecutive data blocks 242 of the file 122, including a data block O to a data block Y having consecutive disk block addresses. By pointing to the consecutive data blocks by a single extent of the inode 110, it is possible to directly point to a larger number of data blocks using a smaller number of extents. In such extent-based index structure, the number of extents included in the mapping information 114 also depends on the size of the inode 110. In the extent-based index structure, an extent having pointed to corresponding data blocks can be referred to as an allocated extent and an extent having not pointed to any data blocks can be referred to as a free extent.

It would be appreciated that only an example environment is illustrated in FIG. 1. More files and their associated inodes can be included in this environment. FIG. 2A and FIG. 2B only illustrate some specific examples of the two types of index structures. In other examples, the pointer-based index structure may also have more, less or a different number of direct pointers or indirect pointers, and each indirect pointer may also point to the data blocks of the file in an indirect pointing manner at different levels. The extent-based index structure may also have more, less or a different number of extents and each extent directly points to a different number of consecutive data blocks. In some cases, depending on the write of the file, a single extent may point to only one data block during a certain period of time or for all the time.

The file system can select a corresponding index structure for an inode associated with a file during configuration, for example a pointer-based index structure of FIG. 2A or an extent-based index structure of FIG. 2B. In a conventional solution, the inode will not be changed after being created as having a corresponding index structure according to the system configuration. However, different index structures have their own advantages and disadvantages in performing the file indexing.

The pointer-based index structure is highly efficient for random input/output (I/O) operations and can be used to index large-scaled files. However, in some cases, in order to read, write or delete one or more data blocks that store the file data, the pointer-based index structure may introduce many I/O operations. For example, if the data block to be read, written or deleted is indirectly indexed in multiple levels, one I/O operation will be split into several I/O sub-operations as it needs to access the corresponding indirect index blocks (especially when some indirect index blocks cannot be cached in the memory). On the other hand, even if the plurality of data blocks to be read, written or deleted are addressed by the consecutive disk addresses of the file system, the corresponding I/O operations are still needed to check the direct pointers and the indirect pointers one by one per data block, so as to determine the pointers pointing to the respective data blocks. Such file access process not only has low efficiency, but also wastes a disk storage space and memory for storing the pointers and the indirect index blocks. The pointer-based index structure is also quite low-efficient for file deletion, especially for deleting large files. When a part of or full of the file data is to be deleted, the data blocks are needed to be modified one by one because operations on the data blocks are protected by transaction to keep the file system consistent. For a large file, the deleting process may take several minutes or even hours and also consume a large amount of processing resources, power supply resources and the like.

The extent-based index structure is especially beneficial for sequential I/O operations because these operations will read, write or delete consecutive data blocks. The sequential I/O operations often occur in some particular type of file systems, such as an archiving system, backup file system and the like. In these file systems, using an extent-based index structure can improve I/O performance and save the disk and cache space for storing the mapping information because it will not require an indirect index block to perform any indirect mapping. However, for random I/O operations, the performance of the extent-based structure will degrade because different data portions of the file may be written into inconsecutive data blocks during frequent random I/O operations, such that each extent may only directly point to a single data block or several consecutive data blocks. This will result in mapping to only a small part of the file by the inode.

According to implementations of the present disclosure, there is provided an improved solution for file indexing. The solution combines different index structures and provides a more flexible index structure for an inode of a file. Specifically, a first inode is first created for the file, and a mapping therein points to a plurality of data blocks storing the file in a first index structure. Then, depending on whether a conversion condition is satisfied, the mapping for the file can be converted. If the conversion condition is satisfied, a second inode is created and the mapping in the first inode is converted into a mapping in the second inode, which points to the plurality of data blocks storing the file in a second different index structure. In this way, it is possible to convert between different index structures so as to achieve file indexing more flexibly. By setting the conversion condition, advantages of the respective index structures can be achieved during different time periods of the file, depending on the change of the file storage and at the same time disadvantages of the index structures can be avoided as much as possible.

Figure 3:
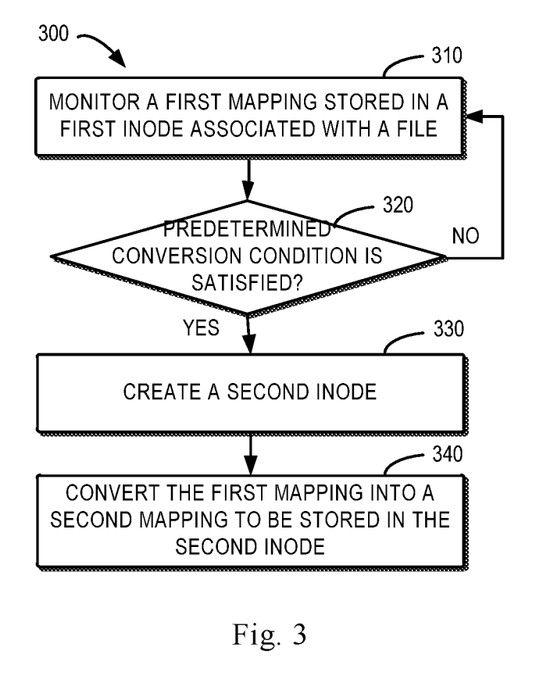
FIG. 3 illustrates a flowchart of a process of indexing a file in accordance with an embodiment of the present disclosure.

Embodiments of the present disclosure will be described in details with reference to the drawings. FIG. 3 illustrates a flowchart of a process 300 of indexing a file in accordance with an embodiment of the present disclosure. The process 300 can be implemented by the file system 120, e.g., by a control module or a device of the file system 120. In other embodiments, the process 300 may also be implemented by a computing device independent of the file system 120. For the sake of discussion, the process 300 is described with reference to FIG. 1, FIG. 2A, and FIG. 2B and the file system 120 is taken as an example of the entity which implements the process 300.

At 310, the file system 120 monitors a mapping stored in an inode associated with the file 122. The inode that has been created may be referred to as a first inode. The file system 120 may create the first inode when the file 122 is initially written into this system. The first inode stores file metadata of the file 122 and also stores the mapping for the file 122 (referred to as a first mapping for the sake of discussion). The first mapping points to a plurality of data blocks storing the file 122 in the file system 120 in a first index structure. Different data portions of the file 122 are stored in these data blocks. The first index structure may include a pointer-based index structure shown in FIG. 2A or an extent-based index structure shown in FIG. 2B.

According to embodiments of the present disclosure, the file system 120 may select different index structures for creating the inode associated with the file 122. The file system 120 may also change the index structure of the inode associated with the file 122 depending on the requirement, so as to improve flexibility of the file indexing. The first index structure may be a pointer-based index structure shown in FIG. 2A or an extent-based index structure shown in FIG. 2B. In some embodiments, the index structure used in the inode can be identified using a flag bit in the first inode. For example, a flag bit "0" may be used to indicate the extent-based index structure and a flag bit "1" may be used to indicate the pointer-based index structure.

In some embodiments, the file system 120 can create, based on a default configuration, the first inode of the file 122 to have the extent-based index structure as shown in FIG. 2B. For example, if the file system 120 is configured as an archiving system or a backup file system, the probability of occurrence of sequential I/O operations is higher in such system and a file may be read or written consecutively. Accordingly, an inode having the extent-based index structure may be created for each file by default. In other embodiments, the first inode of the file 122 may also be created as having the pointer-based index structure as shown in FIG. 2A.

The file system 120 may continuously or periodically monitor the first mapping stored in the first inode. At 320, the file system 120 determines (or ascertains), based on the first mapping, whether a predetermined conversion condition is satisfied. The predetermined conversion condition depends on the first index structure used in the first inode, which will be discussed in details below. In accordance with certain embodiments, the involved circuitry outputs an indication (e.g., a signal, a result, a value, etc.) as to whether the predetermined conversion condition is satisfied. In response to the predetermined conversion condition being satisfied, the file system 120 creates a second inode at 330 and converts the first mapping into a second mapping to be stored in the second inode at 340. The second mapping points to the plurality of data blocks storing the file 122 in a second index structure different from the first index structure. In this way, when the conversion condition is satisfied, a further inode can be created for the file 122 to point to the data blocks according to a different index structure. The conversion from the first mapping to the second mapping can be performed based on information including disk block addresses of the plurality of data blocks storing the file 122, the file logic addresses of the file data stored in the file 122 and the like.

It will be described below conversion from the extent-based index structure to the pointer-based index structure and the inverse conversion.

In some embodiments, the first mapping of the first inode points to the plurality of data blocks storing the file 122 in the extent-based index structure. Each extent directly points to a set of consecutive data blocks storing part of the file 122. The extent-based index structure is particularly suitable for the file system having many sequential I/O operations, such as the archiving system, the backup file system and the like. In such system, the size of a data block for storing the file data may also be extended, e.g., extended from 8 KB to 1 MB or a larger unit. In this manner, a larger data portion of the file 122 can be indicated using a single extent.

In order to understand the conversion from the extent-based index structure to the pointer-based index structure when being triggered by the predetermined conversion condition, it first describes how to perform the file indexing through the first inode under the extent-based index structure. In the I/O operations for the file 122 such as writing, reading, deleting and the like, the first inode is needed to perform the file indexing to determine the addresses of the data blocks.

When processing a write request for the file 122, it is first determined whether the file 122 supports the extent-based index structure, which can be determined by the flag bit in the associated inode. The write request will write some file data of the file 122 into one or more data blocks, which may cause allocation of a new extent(s). Whether a new extent is to be allocated is depending on the specific requirement of the write operation. If the write request is an overwrite request, it indicates writing the file data of the file 122 into one or more data blocks pointed to by the allocated extent to replace the data therein. Accordingly, it can directly write the data into the corresponding data blocks without allocating a new extent. If the write request is to write a hole into the file (e.g., a data portion between two written data portions) or an append write (e.g., writing after the written data portion) rather than the overwrite request, it is required to allocate a new extent for the file data to be written to directly point to one or more consecutive data blocks storing the file data. The type of the write request can be determined by the file logic address indicated by the write request, the disk block address to be written and the mapping information in the allocated extent.

In the case of allocating a new extent, it is determined whether the new extent can be merged with the allocated extent. If a new allocated data block(s) for storing the file data is consecutive on the disk with the data blocks that have already stored other file data of the file, then the extents are merged so as to indicate these consecutive data blocks using only one extent. If they cannot be merged, a new extent can be added in the first inode.

When processing a read request for the file 122, it is first determined whether the file 122 supports the extent-based index structure. If the file 122 supports the extent-based index structure, it is then determined an extent corresponding to the file data required to be read by the read request in the first inode. The extent can be determined, for example, based on the file logic address in the read request. By the determined extent, disk block addresses of the data blocks in which the file data to be read are located can be obtained and data are read from the corresponding data blocks. Since the extent points to the corresponding data blocks with the direct mapping, it is possible to complete the data reading more quickly than the pointer-based index structure in various cases without requiring additional reading for the indirect index blocks. In addition, the information of the first inode can be cached in the memory, which can further increase the speed of the file indexing.

When processing a deletion request for the file 122 (deleting all files or partial file data), although the deletion of the file metadata and the mapping information in the inode is protected by the transaction, there is only a small amount of extent information in the extent-based index structure, not too many transaction operations are introduced due to the extent modification. Therefore, efficient file deletion can be achieved.

Since the size of the inode is relatively fixed, the number of extents is also limited in the extent-based index structure. In some embodiments, if the first inode has the extent-based index structure, the predetermined conversion condition may be associated with the number of allocated extents in the first inode. A predetermined number threshold can be set and is compared with the number of the allocated extents in the first inode. If the number of the allocated extents reaches the predetermined number threshold, it can be determined that the predetermined conversion condition is satisfied. The predetermined number threshold can be set to be smaller than the number of extents allocable in the first inode. The number of the allocable extents depends on the storage space for storing the mapping information in the inode. In some examples, if the portion of the first inode available for storing the mapping information can store seven extents, the predetermined number threshold may be set to, for example, six or a value smaller than six.

Based on the above I/O operations associated with the extent-based index structure, it can be determined that: when a write request for the file is received, the number of extents in the first inode will increase, which may reach the predetermined number threshold. In some embodiments, the file system 120 monitors, in response to the write request for the file, the first mapping of the first inode and then determines whether the predetermined conversion condition is satisfied. In some embodiments, it can be determined whether the write request introduces allocation of a new extent(s) and then the determination of the predetermined conversion condition is triggered when the write request introduces allocation of new extents. For example, if the write request is not an overwrite request but is, for example, a hole writing or an append write for the file, it can be determined that a new extent will be allocated, and thus it can be determined whether the predetermined conversion condition is satisfied. The determination of the predetermined conversion condition can be performed after processing the current write request.

When the predetermined conversion condition is determined to be satisfied, the second inode will be created as mentioned above and the first mapping is converted into the second mapping to be stored in the second inode. The second mapping may point to a plurality of data blocks of the file 122 in the pointer-based index structure because the pointer-based index structure may point to a large file with data blocks distributed across many discrete locations. The mapping conversion may be executed following various rules as long as the second mapping can correctly point to the plurality of data blocks of the file 122 in a direct or indirect manner. In some embodiments, the conversion of the mapping can be performed though background operations. The second inode may also include file metadata of the first inode.

When the second node is created and stored with the second mapping, the file 122 may have two associated inodes, i.e., the first inode and the second inode. The second inode can also be referred to as a swap inode. The second inode is created to avoid system breakdown during the I/O operations for the file 122 if the first inode cannot carry more mapping information, which results into missing of the mapping information of the file 122. In some embodiments, when there are the first inode and the second inode, the first mapping in the first inode and the second mapping in the second inode can be simultaneously updated in response to receiving a deletion request or write request for the file 122 (e.g., deleting from or writing into one or more data blocks of the file 122). This can avoid inconsistency of the mapping information in the two inodes. In response to receiving a read request for the file 122, the file indexing can be performed using the first inode or the second inode.

In some embodiments, with the processing of more write requests for the file 122, if the number of the plurality of allocated extents is continuously increasing (e.g., reaching a further predetermined number threshold) in the first inode, it means that the extent-based index structure cannot correctly index the file, and the first inode can be discarded accordingly. The predetermined number threshold for determining failure of the first inode may be, for example, a value greater than the predetermined number threshold that is used for determining the predetermined conversion condition being satisfied. For example, if the number of the allocable extents is seven in the first inode, the predetermined number threshold for determining the failure of the first inode can be set to seven. In the file indexing after the first inode is discarded, only the second inode can be updated and utilized.

The conversion from the extent-based index structure to the pointer-based index structure is described above. In other embodiments, the inverse conversion, i.e., the conversion from the pointer-based index structure to the extent-based index structure, can also be performed. For example, in some file systems, the inode associated with the file 122 may be first created to have the pointer-based index structure. If it is found that the file 122 is often written into consecutive data blocks in sequence in the subsequent writes of the file 122, the first mapping of the pointer-based index structure will be converted into the second mapping of the extent-based index structure to improve the I/O performance.

Specifically, when the predetermined conversion condition is determined to be satisfied, it can be determined whether the plurality of data blocks to which the first mapping in the first inode points include a predetermined number of consecutive data blocks. If the plurality of data blocks are determined to include the predetermined number of consecutive data blocks, it can be determined that the predetermined conversion condition is satisfied. The determination of the consecutive data blocks can be performed by looking up the disk block addresses of the plurality of data blocks to which the first mapping points and the file logic addresses of the file data stored in the plurality of data blocks. If it is found that a plurality of data blocks is consecutive, or a plurality of groups of consecutive data blocks is found, the predetermined conversion condition is determined to be satisfied.

Similar to the conversion from the extent-based index structure to the pointer-based index structure, when a write request for the file is received, the number of data blocks in the first inode will increase, which may introduce more consecutive data blocks. In some embodiments, the file system 120 monitors the first mapping of the first inode and determines, in response to the write request for the file, whether the predetermined conversion condition is satisfied. The determination of the predetermined conversion condition can be executed after processing the current write request.

When the predetermined conversion condition is determined to be satisfied, the second inode is created as mentioned above and the first mapping is converted into the second mapping to be stored in the second inode. The second mapping can point to the plurality of data blocks of the file 122 in the extent-based index structure. Each extent points to a set of consecutive data blocks, or can point to one discrete data block in the plurality of data blocks. The mapping conversion can be performed following various rules as long as the second mapping can correctly point to the plurality of data blocks of the file 122 in a direct or indirect way. In some embodiments, the conversion of the mapping can be performed though background operations. The second inode may also include file metadata of the first inode.

During the time when the first inode and the second inode coexist, the first mapping in the first inode and the second mapping in the second inode can be simultaneously updated in response to receiving a deletion request or write request (e.g., deleting or writing into one or more data blocks of the file 122) for the file 122. This can avoid inconsistency of the mapping information in the two inodes. In response to receiving a read request for the file 122, the file indexing can be performed using the first inode or the second inode. In some embodiments, the file indexing can be performed by directly using the second inode to enhance the I/O performance.

The conversion between the extent-based index structure and the pointer-based index structure has been described above. It should be understood that embodiments of the present disclosure are also suitable for conversion between other index structures of the inode. By supporting conversion of the index structure, it can achieve more flexible file indexing and satisfies performance requirements of different I/O operations if required.

Figure 4:
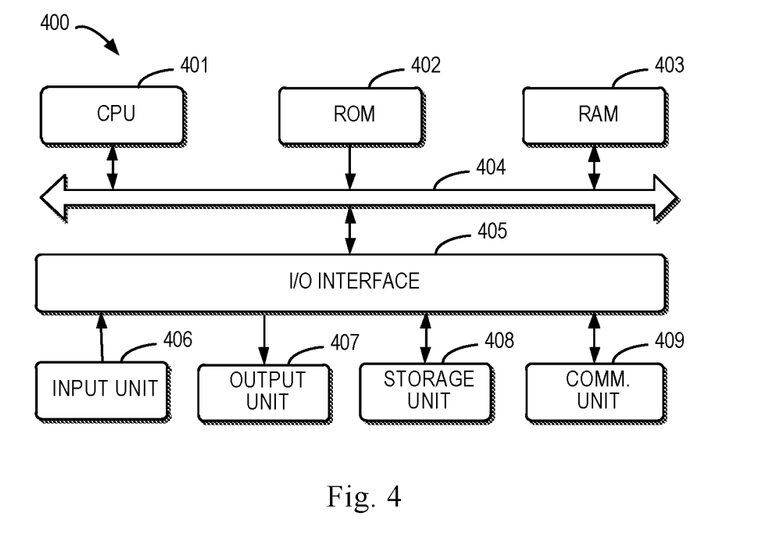
FIG. 4 illustrates a block diagram of an example device that can be used for implementing embodiments of the present disclosure.

FIG. 4 illustrates a schematic block diagram of an example device 400 for implementing embodiments of the present disclosure. The device 400 can be used for implementing the process 300 of FIG. 3. The device 400 can be a device independent of the file system 120 or integrated in the file system 120. As shown, the device 400 includes a central process unit (CPU) 401, which can execute various suitable actions and processing based on the computer program instructions stored in the read-only memory (ROM) 402 or computer program instructions loaded in the random-access memory (RAM) 403 from a storage unit 408. The RAM 403 can also store all kinds of programs and data required by the operations of the device 400. CPU 401, ROM 402 and RAM 403 are connected to each other via a bus 404. The input/output (I/O) interface 405 is also connected to the bus 404.

A plurality of components in the device 400 is connected to the I/O interface 405, including: an input unit 406, such as keyboard, mouse and the like; an output unit 407, e.g., various kinds of display and loudspeakers etc.; a storage unit 408, such as disk and optical disk etc.; and a communication unit 409, such as network card, modem, wireless transceiver and the like. The communication unit 409 allows the device 400 to exchange information/data with other devices via the computer network, such as Internet, and/or various telecommunication networks.

The above described each method and process, such as the process 300, can also be performed by the processing unit 401. In some embodiments, the process 300 can be implemented as a computer software program or a computer program product tangibly included in the machine-readable medium, e.g., storage unit 408. In some embodiments, the computer program can be partially or fully loaded and/or mounted to the device 400 via ROM 402 and/or communication unit 409. When the computer program is loaded to RAM 403 and executed by the CPU 401, one or more actions of the above described process 300 can be implemented. Alternatively, CPU 401 can be configured via any other suitable manners (e.g., by means of firmware) to execute the process 300 in other embodiments.

Those skilled in the art would understand that various steps of the method of the disclosure above may be implemented via a general purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means of the apparatus have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

We claim:

1. A method of indexing a file, comprising:
   determining, based on a first mapping stored in a first inode associated with the file, whether a predetermined conversion condition is satisfied, the first mapping pointing to a plurality of data blocks of a file system storing the file in a first index structure;
   in response to determining that the predetermined conversion condition is satisfied, creating a second inode associated with the file; and
   converting the first mapping into a second mapping to be stored in the second inode, the second mapping pointing to the plurality of data blocks in a second index structure different from the first index structure;
   wherein the first mapping comprises a plurality of allocated extents, an allocated extent directly pointing to a set of consecutive data blocks in the plurality of data blocks; and
   wherein the determining comprises:
   comparing a number of the plurality of extents with a first predetermined number threshold, and
   in response to the number reaching the first predetermined number threshold, determining that the predetermined conversion condition is satisfied.

2. The method of claim 1, wherein the first predetermined number threshold is smaller than a number of extents allocable in the first inode.

3. The method of claim 1, further comprising:
   comparing a number of the plurality of extents with a second predetermined number threshold, the second predetermined number threshold being greater than the first predetermined number threshold; and
   in response to the number reaching the second predetermined number threshold, discarding the first inode.

4. The method of claim 1, further comprising:
   in response to receiving a deletion request or write request for the file, updating the first mapping in the first inode and the second mapping in the second inode.

5. The method of claim 1, wherein determining whether the predetermined conversion condition is satisfied further comprises:
   in response to a write request for the file, increasing the number of the plurality of extents in the first inode prior to comparing the number of the plurality of extents with the first predetermined number threshold.

6. The method of claim 1, further comprising:
   accessing the file via the first inode during a first time; and
   accessing the file via the second inode during a second time that is different from the first time.

7. The method of claim 6, wherein the first index structure is a pointer-based index structure; and
   wherein the second index structure is an extent-based index structure that is different from the pointer-based index structure.

8. The method of claim 7, wherein accessing the file via the first inode includes:
   accessing data blocks of the file in accordance with the pointer-based index structure; and
   wherein accessing the file via the second inode includes:
   accessing the data blocks of the file in accordance with the extent-based index structure.

9. The method of claim 8, wherein the pointer-based index structure includes (i) block pointers that individually point to the data blocks of the file; and (ii) indirect pointers that point to blocks containing at least some of the block pointers that individually point to the data blocks of the file; and wherein the extent-based index structure includes extent pointers that individually point to extents containing the data blocks of the file, each extent being configured to contain consecutive multiple data blocks of the file arranged consecutively.

10. A method of indexing a file, comprising:
determining, based on a first mapping stored in a first inode associated with the file, whether a predetermined conversion condition is satisfied, the first mapping pointing to a plurality of data blocks of a file system storing the file in a first index structure;
in response to determining that the predetermined conversion condition is satisfied, creating a second inode associated with the file; and
converting the first mapping into a second mapping to be stored in the second inode, the second mapping pointing to the plurality of data blocks in a second index structure different from the first index structure;
wherein the first mapping comprises at least one of a direct pointer and an indirect pointer, the direct pointer directly pointing to a single data block of the plurality of data blocks and the indirect pointer indirectly pointing to at least one of the plurality of data blocks via an indirect index block; and
wherein the determining comprises:
determining whether the plurality of data blocks to which the first mapping is pointed include a predetermined number of consecutive data blocks, and
in response to determining that the plurality of data blocks include the predetermined number of consecutive data blocks, determining that the predetermined conversion condition is satisfied.

11. An apparatus for indexing a file, comprising:
a processor; and
a memory coupled to the processor and having instructions stored thereon, the instructions, when executed by the processor, causing the apparatus to perform acts comprising:
determining, based on a first mapping stored in a first inode associated with the file, whether a predetermined conversion condition is satisfied, the first mapping pointing to a plurality of data blocks of a file system storing the file in a first index structure;
in response to determining that the predetermined conversion condition is satisfied, creating a second inode associated with the file; and
converting the first mapping into a second mapping to be stored in the second inode, the second mapping pointing to the plurality of data blocks in a second index structure different from the first index structure;
wherein the first mapping comprises a plurality of allocated extents, an allocated extent directly pointing to a set of consecutive data blocks in the plurality of data blocks; and
wherein the determining comprises:
comparing a number of the plurality of extents with a first predetermined number threshold, and
in response to the number reaching the first predetermined number threshold, determining that the predetermined conversion condition is satisfied.

12. The apparatus of claim 11, wherein the first predetermined number threshold is smaller than a number of extents allocable in the first inode.

13. The apparatus of claim 11, further comprising:
comparing a number of the plurality of extents with a second predetermined number threshold, the second predetermined number threshold being greater than the first predetermined number threshold; and
in response to the number reaching the second predetermined number threshold, discarding the first inode.

14. The apparatus of claim 11, further comprising:
in response to receiving a deletion request or write request for the file, updating the first mapping in the first inode and the second mapping in the second inode.

15. The apparatus of claim 11, wherein determining whether the predetermined conversion condition is satisfied further comprises:
in response to a write request for the file, increasing the number of the plurality of extents in the first inode prior to comparing the number of the plurality of extents with the first predetermined number threshold.

16. An apparatus for indexing a file, comprising:
a processor; and
a memory coupled to the processor and having instructions stored thereon, the instructions, when executed by the processor, causing the apparatus to perform acts comprising:
determining, based on a first mapping stored in a first inode associated with the file, whether a predetermined conversion condition is satisfied, the first mapping pointing to a plurality of data blocks of a file system storing the file in a first index structure;
in response to determining that the predetermined conversion condition is satisfied, creating a second inode associated with the file; and
converting the first mapping into a second mapping to be stored in the second inode, the second mapping pointing to the plurality of data blocks in a second index structure different from the first index structure;
wherein the first mapping comprises at least one of a direct pointer and an indirect pointer, the direct pointer directly pointing to a single data block of the plurality of data blocks and the indirect pointer indirectly pointing to at least one of the plurality of data blocks via an indirect index block; and
wherein the determining comprises:
determining whether the plurality of data blocks to which the first mapping is pointed include a predetermined number of consecutive data blocks, and
in response to determining that the plurality of data blocks include the predetermined number of consecutive data blocks, determining that the predetermined conversion condition is satisfied.

17. A computer program product having a non-transitory computer readable medium which stores a set of instructions for indexing a file; the set of instructions, when carried out by computerized circuitry, causing the computerized circuitry to perform a method of:
determining, based on a first mapping stored in a first inode associated with the file, whether a predetermined conversion condition is satisfied, the first mapping pointing to a plurality of data blocks of a file system storing the file in a first index structure;
in response to determining that the predetermined conversion condition is satisfied, creating a second inode associated with the file; and
converting the first mapping into a second mapping to be stored in the second inode, the second mapping pointing to the plurality of data blocks in a second index structure different from the first index structure;

wherein the first mapping comprises a plurality of allocated extents, an allocated extent directly pointing to a set of consecutive data blocks in the plurality of data blocks; and wherein the determining comprises:

comparing a number of the plurality of extents with a first predetermined number threshold, and in response to the number reaching the first predetermined number threshold, determining that the predetermined conversion condition is satisfied.

18. The computer program product of claim 17, wherein the first predetermined number threshold is smaller than a number of extents allocable in the first inode.

19. The computer program product of claim 17, wherein the method further includes:

comparing a number of the plurality of extents with a second predetermined number threshold, the second predetermined number threshold being greater than the first predetermined number threshold; and in response to the number reaching the second predetermined number threshold, discarding the first inode.

20. The computer program product of claim 17, wherein the method further includes:

in response to receiving a deletion request or write request for the file, updating the first mapping in the first inode and the second mapping in the second inode.

* * * * *